(12) United States Patent
Berstis et al.

(10) Patent No.: US 6,212,327 B1
(45) Date of Patent: Apr. 3, 2001

(54) CONTROLLING RECORD/PLAYBACK DEVICES WITH A COMPUTER

(75) Inventors: Viktors Berstis; Richard Dale Hoffman, both of Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 08/977,295

(22) Filed: Nov. 24, 1997

(51) Int. Cl.[7] .......................... H04N 5/761; H04N 5/7617
(52) U.S. Cl. ................................ 386/83; 386/95
(58) Field of Search .................... 386/83, 46, 1, 386/52, 4, 92, 7, 95; 348/211, 213, 734, 460; 360/32; H04N 5/761, 5/7617

(56) References Cited

U.S. PATENT DOCUMENTS 5,335,079 * 8/1994 Yuen et al. ............................ 386/83
5,541,738 * 7/1996 Mankovitz ............................ 386/83

* cited by examiner

*Primary Examiner*—Robert Chevalier
(74) *Attorney, Agent, or Firm*—Jeffrey S. LaBaw; Felsman, Bradley, Vaden, Gunter & Dillon, LLP

(57) ABSTRACT

A data processing system connected to and controlling an infrared emitter may be utilized to control remote control devices such as video cassette recorders and cassette recorders, allowing the data processing system to program recording by such devices. The data processing system may, for example, be a set-top box located in proximity to remote controlled record/playback devices, relying on line-of-sight or reflected infrared signal transmission, or may be utilized in connection with suitably placed infrared repeaters. The data processing system may also be employed in conjunction with the "server push" network technique, in which a data stream is transmitted to a subscribing client without intervention by the client. The data stream is monitored for user-defined data items. When detected, the data processing automatically controls the appropriate record/playback device to record a broadcast associated with the detected data item.

14 Claims, 5 Drawing Sheets

CONTROLLING RECORD/PLAYBACK DEVICES WITH A COMPUTER

BACKGROUND OF THE INVENTION

1. Technical Field

The present invention relates in general to remote control of consumer electronic devices and in particular to computer-based programming of recording in remote controlled record/playback devices. Still more particularly, the present invention relates to utilizing a computer to control record programming in remote controlled record/playback devices in connection with a server push mechanism.

2. Description of the Related Art

Control over typical consumer electronics devices which utilize infrared remote control interfaces is typically extremely limited. In particular, programming such devices to record or play at specific times, etc. is generally constrained by the capabilities built into the device hardware. Programming such remote controlled devices may also be confusing, as has been frequently noted in connection with video cassette recorders (VCRs) and more recently in connection with unitary compact disc (CD) players, cassette recorders, and AM/FM receivers (often colloquially referred to as "boom boxes"). Flexibility over program control is not generally found in such devices.

The advent of set-top boxes, also referred to variously as a network computer (NC), Internet appliance, Web PC, Internet access device, browser box, etc. (all names for the same concept with minor variations), has introduced a new consideration. Frequently such set-top boxes are themselves capable of being controlled by an infrared remote control. Additionally, the purpose of the devices generally results in the devices being situated in close proximity to a television, VCR, or other remote controlled electronic device, often within the same entertainment center. Much of the same hardware and control software utilized to interface an infrared receiver to a set-top box could be reused to interface the set-top box to an infrared transmitter.

It would be desirable, therefore, to provide a method of controlling programmable electronics devices utilizing the infrared remote control interface under the control of a set-top box or other data processing system. It would further be advantageous to provide such control in a manner consistent with the network technique known as "server push."

SUMMARY OF THE INVENTION

It is therefore one object of the present invention to provide an improved method and apparatus for remote control of consumer electronic devices.

It is another object of the present invention to provide computer-based programming of recording in remote controlled record/playback devices.

It is yet another object of the present invention to provide a method and apparatus for utilizing a computer to control record programming in connection with a server push mechanism in remote controlled record/playback devices.

The foregoing objects are achieved as is now described. A data processing system connected to and controlling an infrared emitter may be utilized to control remote control devices such as video cassette recorders and cassette recorders, allowing the data processing system to program recording by such devices. The data processing system may, for example, be a set-top box located in proximity to remote controlled record/playback devices, relying on line-of-sight or reflected infrared signal transmission, or may be utilized in connection with suitably placed infrared repeaters. The data processing system may also be employed in conjunction with the "server push" network technique, in which a data stream is transmitted to a subscribing client without intervention by the client. The data stream is monitored for user-defined data items. When detected, the data processing automatically controls the appropriate record/playback device to record a broadcast associated with the detected data item.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
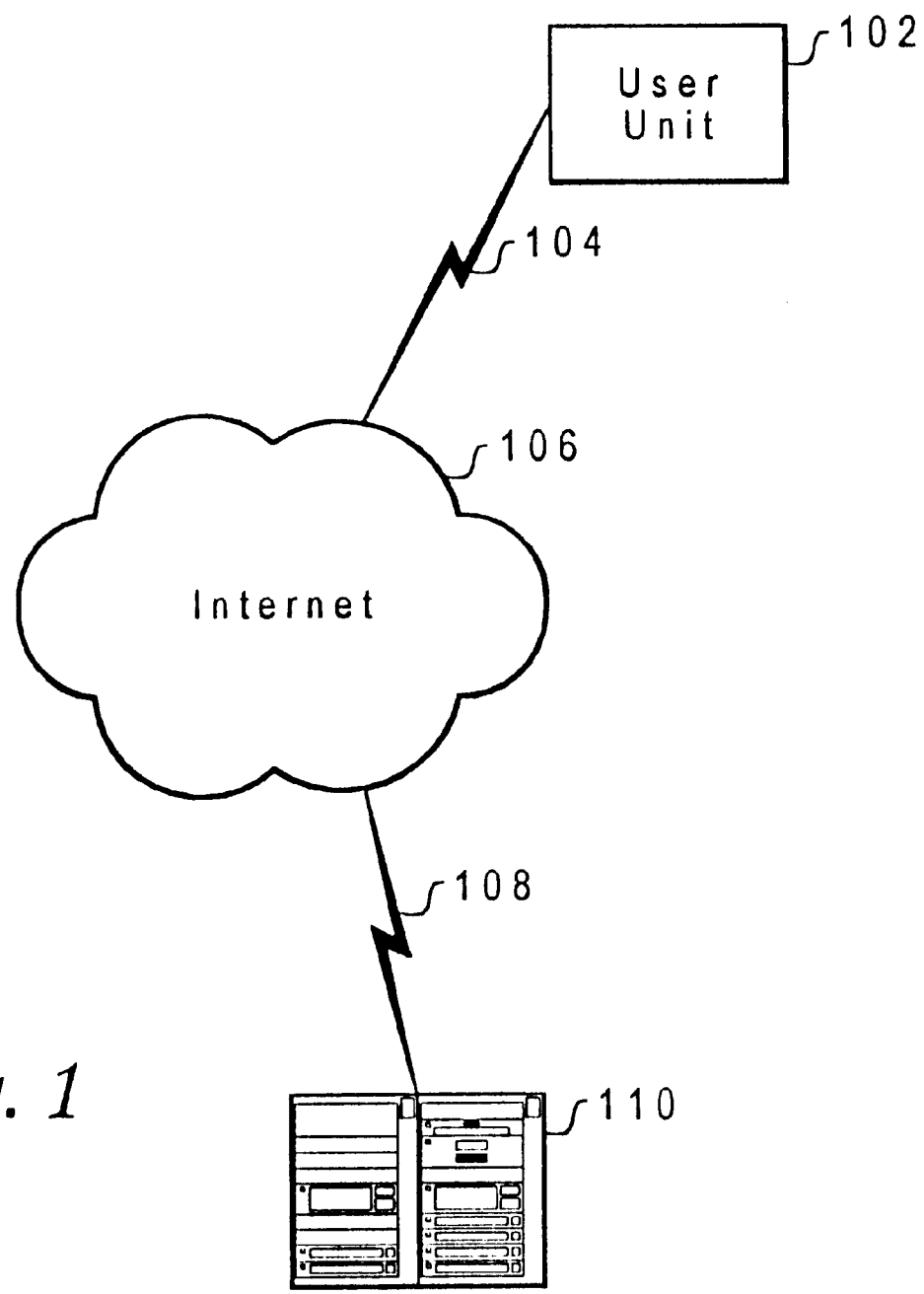
FIG. 1 depicts a network of data processing systems in which a preferred embodiment of the present invention may be implemented.

With reference now to the figures, and in particular with reference to FIG. 1, a network of data processing systems in which a preferred embodiment of the present invention may be implemented is depicted. The exemplary embodiment depicted includes a client 102 connected via communications link 104 to the Internet 106. Communications link 104 may, for example, be in the form of access provided indirectly by an Internet service provider (ISP) or directly via a proxy within a firewall, as is known in the art. Client 102 includes a Java-enabled browser application, allowing client 102 to retrieve and display information formatted in accordance with the HyperText Markup Language (HTML) and to run Java applets, or a Java interpreter, allowing client 102 to execute Java applications.

Also connected to Internet 106, via communications link 108, is server 110. Server 110 may be a World Wide Web (WWW, often simply referred to as "the Web") server capable of receiving and serving HyperText Transmission Protocol (HTTP) requests. Server 110 may also utilize the "server push" data transfer technique to transmit information streams to client 102. Client 102 may thus retrieve HTML-formatted data from server 110 and display such information, executing Java applets in connection with such retrieval and/or display. Java applets thus executed may employ the process of the present invention to control record/playback devices in conjunction with receiving a server push information stream.

Figure 2:
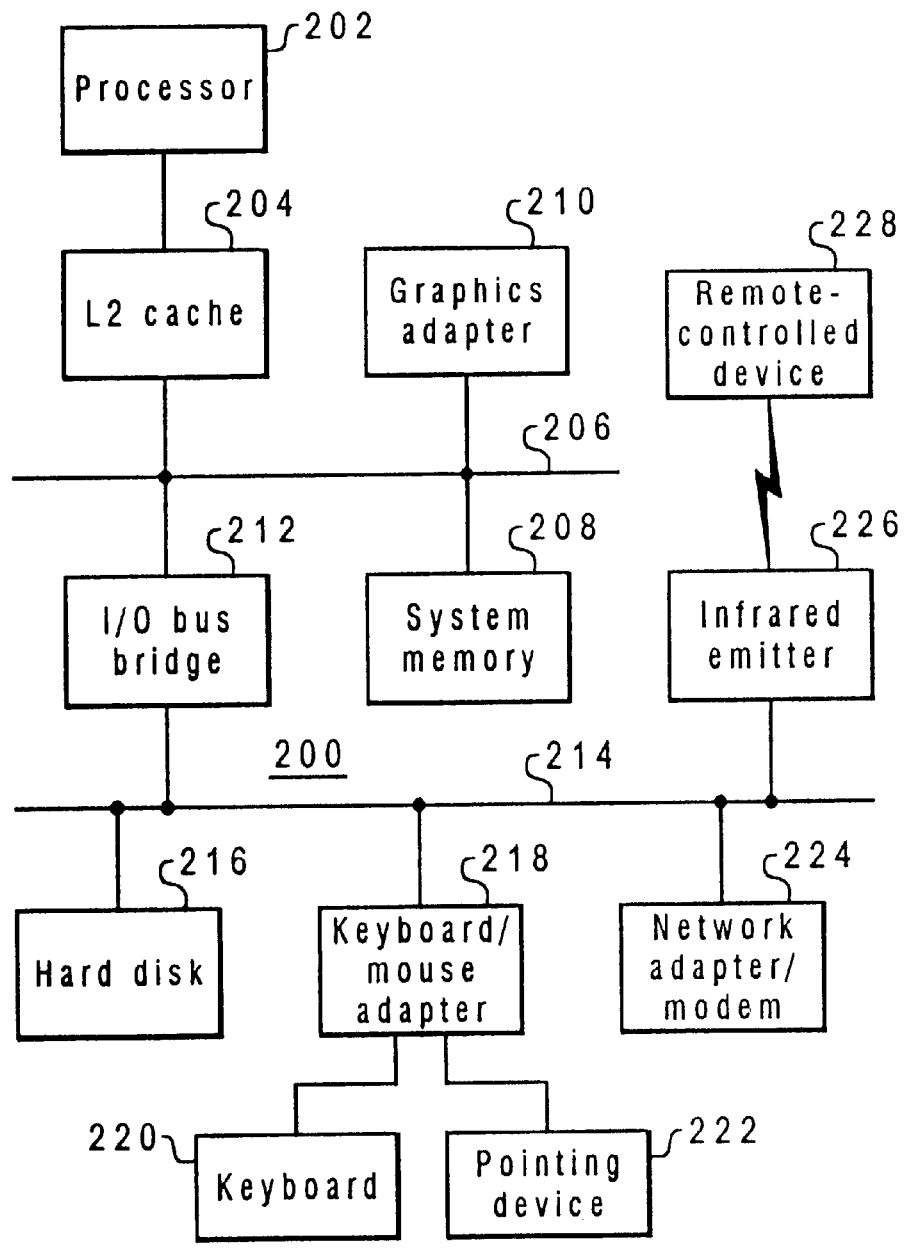
FIG. 2 is a block diagram of a data processing system in accordance with a preferred embodiment of the present invention.

Referring to FIG. 2, a block diagram of a data processing system in accordance with a preferred embodiment of the present invention is depicted. Data processing system 200 may be client 102 depicted in FIG. 1. Data processing system 200 in the exemplary embodiment includes a processor 202, which may be a PowerPC™ processor available for International Business Machines Corporation of Armonk, New York. Processor 202 is connected to a level two (L2) cache 204, which is utilized to stage data to and from processor 202 at reduced access latency. L2 cache 204 is connected in turn to an interconnect or system bus 206, which is also connected, in the embodiment depicted, to system memory 208 and memory-mapped graphics adapter 210. Graphics adapter 210 provides a connection for a display device (not shown) on which the user interface of software executed within data processing system 200 is displayed.

Also connected to system bus 206 in the exemplary embodiment is input/output (I/O) bus bridge 212, which provides an interface between system bus 206 and I/O bus 214. A nonvolatile memory such as hard disk drive 216 may be connected to I/O bus 214, as may keyboard/mouse adapter 218, which provides connection to I/O bus 214 for keyboard 220 and pointing device 222. Pointing device 222 may be a mouse, trackball, or the like. Also connected to I/O bus 214 may be network adapter 224 for connecting data processing system 200 to a local area network (LAN), the Internet, or both. Those skilled in the art will appreciate that other devices may be incorporated into data processing system 200, such as an optical disk drive or a modem.

The operation of data processing systems of the type depicted in FIG. 2 is well known in the art. Program information comprising instructions and/or data is stored on nonvolatile memory 216 and may be selectively copied into system memory 208 once data processing system 200 is powered on. Processor 202 executes the instructions within such program information and generates text or graphical information for presentation on display device connected via graphics adapter 210, where the information may be viewed by a user. The user may selectively control operation of data processing system 200 through input entered on keyboard 220 or through pointing device 222.

In accordance with a preferred embodiment of the present invention, data processing system 200 also includes an infrared emitter device 226 connected to I/O bus 214 capable of emitting infrared signals in response to instructions received via I/O bus 214. Infrared emitter 226 is designed to emit infrared signals typical of those found in standard remote control devices, as are known in the art. Infrared emitter 226 may, for example, be integrated into data processing system 200 or connected to a serial port of data processing system 200 as a peripheral in the manner of a pointing device. Infrared emitter 226 should duplicate the infrared signals employed to control remote controlled device 228 such as a VCR, a unitary AM/FM receiver and cassette recorder/player, or other remote controlled record/playback device. Infrared emitter 226 may be utilized alone, relying on either line-of-sight signal transmission or signal reflection off surfaces such as walls, ceilings, etc., or may be accompanied by one or more infrared repeaters (not shown) having no physical connection to data processing system 200 and configured to receive and repeat infrared signals. Such infrared repeaters are known to and utilized by those skilled in the art for a variety of purposes. Suitably placed infrared repeaters could permit data processing system 200 to control the operation of record/playback device 228 using infrared signals despite separation of the two device, as where the two devices are located in different rooms.

Through emitter device 226, data processing system may be utilized to program recording and/or playing by remote controlled record/playback device 228. For example, a program may be written allowing the user to program data processing system 200 to control: a VCR to tape channel 5 every weekday at 4:00 pm (so that the user does not miss "Oprah"); a CD player and AM/FM receiver to play either a CD or a designated radio station every weekday morning at 6:00 am for at least 20 minutes to wake up the user; an AM/FM receiver and cassette recorder to tape a radio show on 101.1 FM every Sunday from 7:00 pm to midnight; or to turn off a television set every night at 2:00 am. Thus, consumers would be provided with flexible capability to program a variety of remote controlled devices. Accordingly, data processing system 200 includes a program which, when load, permits control of record/playback device 228 as described below. The program may be a Java applet or any other suitable program.

Figure 3:
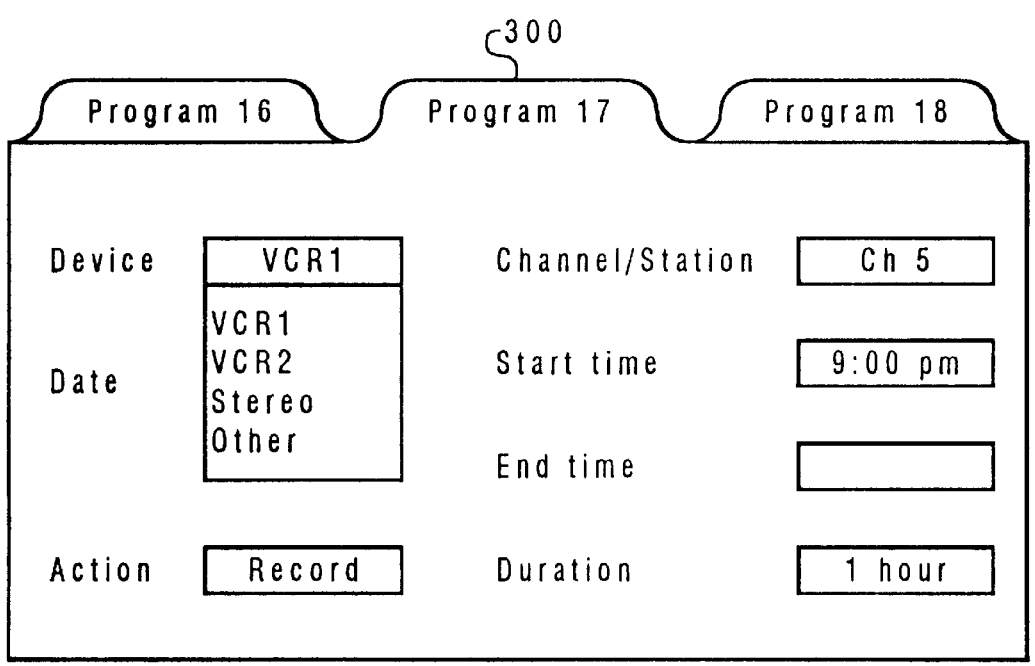
FIG. 3 depicts a diagram of a user interface for a program controlling a record/playback device in accordance with a preferred embodiment of the present invention.

Referring to FIG. 3, a diagram of a user interface for a program controlling a record/playback device in accordance with a preferred embodiment of the present invention is illustrated. The user interface may be provided to allow a user to control a data processing system including a connection to and control over an infrared emitter, such as data processing system 200 depicted in FIG. 2, in the programmed control of remote controlled record/playback devices. User interface 300 in the example shown includes data entry locations for a user to enter a device (such as a VCR or stereo), a date (which may include "Daily" or "Every Thursday" in addition to calendar dates), an action (record, play, turn off, etc), a channel or station (if applicable), a start time, an end time, and a duration. In the case of recording devices, at least two of three data items selected from the group of start time, end time, and duration may be required. User interface 300 may also include a data location for a user to enter keywords or other such data items (such a VCR programming codes). The keywords may then be utilized as described below for automatically recording broadcasts. User interface 300 is providely solely as an example for the purposes of explaining the present invention and is not meant to imply functional limitations. Those skilled in the art will recognize that many other user interfaces are possible.

Figure 4A:
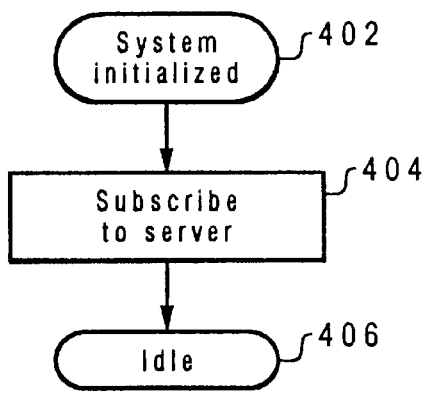
FIGS. 4A–4C are high level flowcharts for a process of controlling a remote controlled device utilizing a data processing system in connection with a server push mechanism in accordance with a preferred embodiment of the present invention.
Figure 4B:
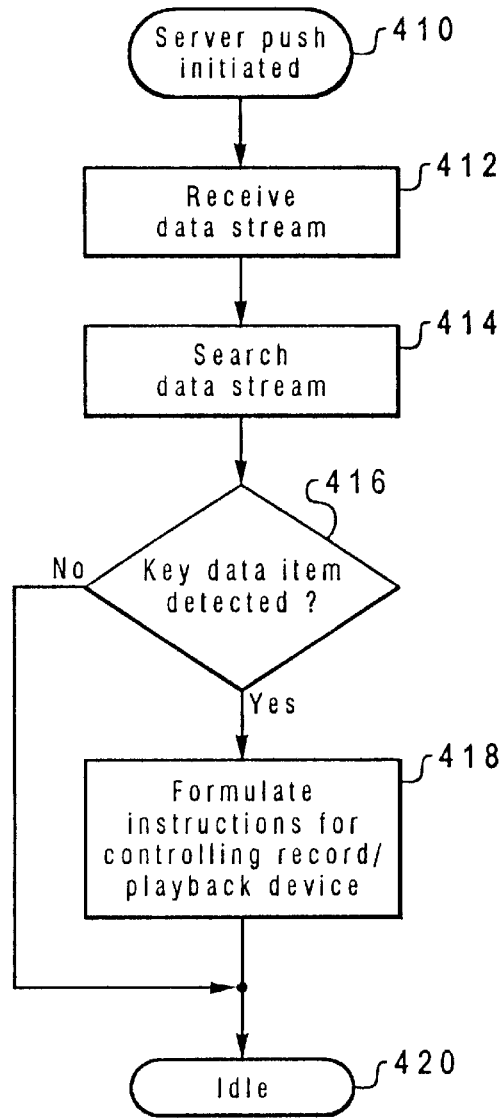
Figure 4C:
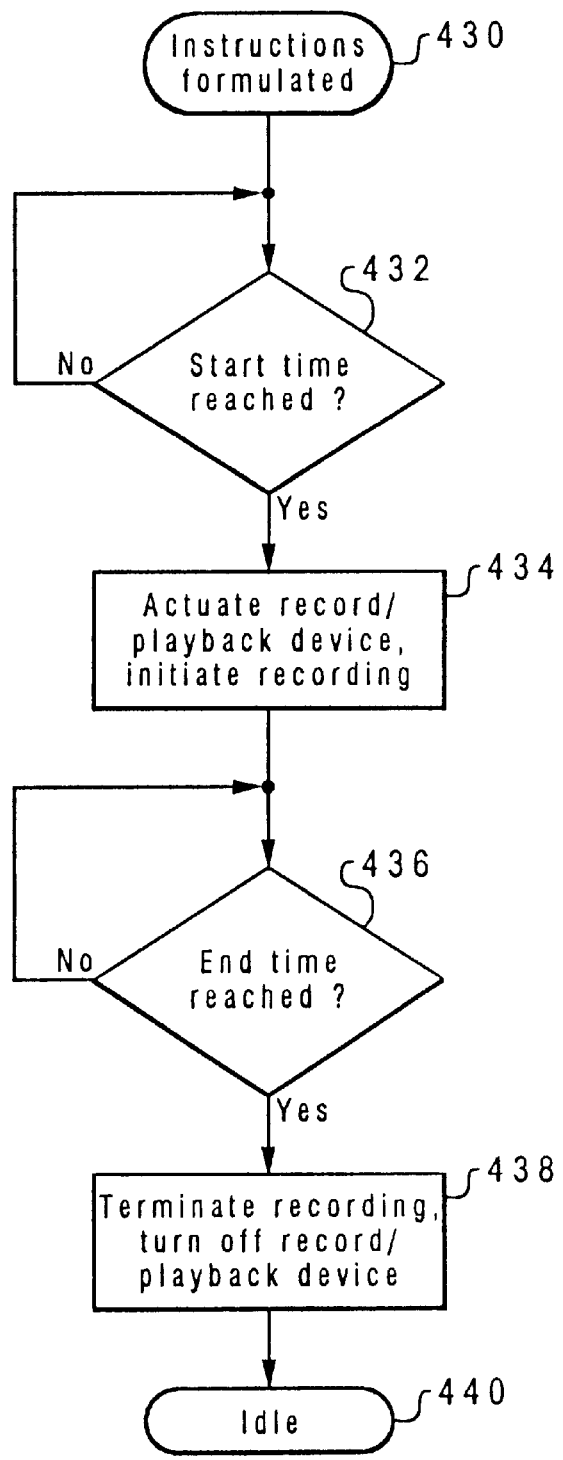

With reference now to FIGS. 4A–4C, high level flowcharts for a process of controlling a remote controlled device utilizing a data processing system in connection with a server push mechanism in accordance with a preferred embodiment of the present invention are illustrated. The process may be implemented within a data processing system including connection to and control over an infrared emitter, such as data processing system 200 depicted in FIG. 2 configured as client 102 depicted in FIG. 1.

The network technique known as "server push" allows servers to send a stream of information to a client without intervention by the client beyond registration or subscription. Currently, server push is used to transmit streams of information to feed such programs as tickers, news feeds, and continuous weather forecast. However, it may also be utilized to transmit information for the control of data processing systems and Web appliances. For example, the server push mechanism may be employed to transmit a TV guide, a steady stream of information containing the current contents of selected TV channels. The information stream may include, for example, text descriptions of programs and VCR programming codes similar to those current published as part of the "VCR+" service. The information stream may be employed by a data processing system including infrared emitter capabilities to control programming of a VCR. For example, the user may instruct the data processing system to record programs whose descriptions in the information stream contains keywords such as "Cary Grant" of "basketball". Thus, programs of interest to the use will be automatically recorded even if the user is unaware of them. A simpler use of the same system would provide an audible alarm a few minutes before a program of interest to the user.

FIG. 4A illustrates a process for subscribing to a server push. The process may be implemented within client 102 depicted in FIG. 1 to subscribe to server push from server 110. The process begins at step 402, which depicts initialization of the data processing system. The process then passes to step 404, which illustrates subscribing or registering with the server for receipt of server push information streams, and then to step 406, which depicts the process becoming idle until the system is again initialized.

FIG. 4B illustrates a process for receiving a data stream as part of a server push. The process begins at step 410, which depicts the server push being initiated. The process next passes to step 412, which illustrates the client receiving the data stream transmitted by the server push, and then to step 414, which depicts searching the data stream for key data items, such as user-selected keywords or VCR programming codes, within the data stream. Although depicted as separate steps, the steps of receiving and searching the data stream may alternatively be performed concurrently. Additionally, the data stream may be passed to temporary or permanent storage for boolean keyword searches.

The process passes next to step 416, which depicts a determination of whether a key data item was detected within the data stream. If so, the process passes to step 418, which illustrates formulating instructions for controlling the record/playback device to record a program associated with the key data item detected in the data stream. If not, the process passes directly to step 420, which depicts the process becoming idle until another server push is initiated.

FIG. 4C illustrates a process for controlling a record/playback device pursuant to instructions formulated as a result of detecting a key data item within a server push data stream. The process begins at step 430, which depicts the instructions being formulated for controlling emission of infrared signals at the start and end time of the program to be recorded. The process then passes to step 432, which illustrates a determination of whether the start time of the program to be recorded has arrived. If not, the process continues to wait for the start time to arrive. When the start time arrives, the process passes to step 434, which depicts actuating the record/playback device and initiating recording of the program by emitting infrared signals controlling the record/playback devices.

The process then passes to step 436, which depicts a determination of whether the end time of the program being recorded has arrived. If not, the process continues to wait until the end time arrives, with the record/playback device continuing to record the program. When the program end time arrives, the process passes to step 438, which illustrates terminating recording by the record/playback device and turning off the record/playback device by emitting appropriate infrared signals. The process then passes to step 440, which depicts the process becoming idle. Those skilled in the art will recognize that the process illustrated may easily be extended for programming a data processing system to record multiple programs and/or to control recording on multiple devices.

The present invention allows a data processing system having an infrared emitter to control recording in a record/playback device in connection with a server push operation. Greater flexibility in programming is thus provided, even providing control for recording programs of which the user is unaware detected by searching for key data items within server push information streams. The key data items may be keywords within text describing programs or VCR programming code.

It is important to note that while the present invention has been described in the context of a fully functional data processing system, those skilled in the art will appreciate that the mechanism of the present invention is capable of being distributed in the form of a computer readable medium of instructions in a variety of forms, and that the present invention applies equally regardless of the particular type of signal bearing media used to actually carry out the distribution. Examples of computer readable media include: nonvolatile, hard-coded type media such as read only memories (ROMs) or erasable, electrically programmable read only memories (EEPROMs), recordable type media such as floppy disks, hard disk drives and CD-ROMs, and transmission type media such as digital and analog communication links.

While the invention has been particularly shown and described with reference to a preferred embodiment, it will be understood by those skilled in the art that various changes in form and detail may be made therein without departing from the spirit and scope of the invention.

What is claimed is:

1. A method of programming a remote controlled infrared device, comprising:

receiving a data stream containing information associated with a plurality of programs at a controlling device coupled to and controlling an infrared emitter;

searching the data stream utilizing the controlling device for user selected keywords and programming codes; and responsive to detecting user selected keywords or programming codes within the data stream, employing the controlling device to automatically generate infrared signals signaling a remote controlled recording device to record a program within the plurality of programs which is associated with the user selected keywords or programming codes.

2. The method of claim 1, wherein the step of receiving a data stream containing information associated with a plurality of programs further comprises:

receiving text descriptive of the plurality of programs.

3. The method of claim 1, wherein the step of receiving a data stream containing information associated with a plurality of programs further comprises:

receiving VCR programming codes associated with the plurality of programs.

4. The method of claim 1, wherein the step of automatically generating infrared signals signaling a remote controlled recording device to record a program within the plurality of programs associated with the user selected keywords or programming codes further comprises:

generating infrared signals at a start time of the program actuating the recording device.

5. The method of claim 4, wherein the step of automatically generating infrared signals signaling a remote controlled recording device to record a program within the plurality of programs associated with the user selected keywords or programming codes further comprises:

generating infrared signals at an end time of the program stopping the recording device.

6. A mechanism for programming a remote controlled infrared device, comprising:

a data processing system receiving a data stream containing information associated with a plurality of programs and searching the data stream for a user selected keywords and programming codes;

an infrared emitter connected to and controlled by the data processing system; and a remote controlled recording device receiving infrared signals generated by the infrared emitter, wherein the infrared emitter automatically generates infrared signals signaling the remote controlled recording device to record a program within the plurality of programs associated with user selected keywords or programming codes in response to the data processing system detecting the user selected keywords or programming codes within the data stream.

7. The mechanism of claim 6, wherein the data processing system further comprises:

means for receiving text descriptive of the plurality of programs.

8. The mechanism of claim 6, wherein the data processing system further comprises:

means for receiving VCR programming codes associated with the plurality of programs.

9. The mechanism of claim 6, wherein the data processing system further comprises:

means for generating infrared signals at a start time of the program actuating the recording device.

10. The mechanism of claim 9, wherein the data processing system further comprises:

means for generating infrared signals at an end time of the program stopping the recording device.

11. A computer program product within a computer usable medium, comprising:

instructions within the computer usable medium for receiving a data stream at a controlling device containing information associated with a plurality of programs;

instructions within the computer usable medium for searching the data stream for user selected keywords and programming codes utilizing the controlling device; and instructions within the computer usable medium, responsive to detecting user selected keywords or programming codes within the data stream, for automatically generating infrared signals, utilizing the controlling device, which signal a remote controlled recording device to record a program within the plurality of programs associated with the user selected keywords or programming codes.

12. The computer program product of claim 11, wherein the instructions for receiving a data stream containing information associated with a plurality of programs further comprise:

instructions for receiving text descriptive of the plurality of programs.

13. The computer program product of claim 11, wherein the instructions for receiving a data stream containing information associated with a plurality of programs further comprise:

instructions for receiving VCR programming codes associated with the plurality of programs.

14. The computer program product of claim 11, wherein the instructions for automatically generating infrared signals signaling a remote controlled recording device to record a program within the plurality of programs associated with the data item further comprise:

instructions for generating infrared signals at a start time of the program actuating the recording device;

instructions for generating infrared signals at a stop time of the program stopping the recording device.

* * * * *